(12) United States Patent
McVay et al.

(10) Patent No.: US 6,845,858 B2
(45) Date of Patent: Jan. 25, 2005

(54) CONCRETE CHUTE

(75) Inventors: David Wayne McVay, Fort Wayne, IN (US); Alan Ward Zemen, Fort Wayne, IN (US)

(73) Assignee: Summit Manufacturing Corporation, Fort Wayne, IN (US)

( * ) Notice: Subject to any disclaimer, the term of this patent is extended or adjusted under 35 U.S.C. 154(b) by 0 days.

(21) Appl. No.: 10/769,892

(22) Filed: Feb. 3, 2004

(65) Prior Publication Data

US 2004/0154898 A1 Aug. 12, 2004

Related U.S. Application Data

(60) Provisional application No. 60/444,675, filed on Feb. 4, 2003.

(51) Int. Cl.[7] .............................................. B65G 11/00
(52) U.S. Cl. .............................. 193/6; 193/2 R; 193/4; 193/5; 193/33
(58) Field of Search ............................... 193/2 R, 6, 4, 193/5, 33, 25 R, 25 A

(56) References Cited

U.S. PATENT DOCUMENTS

| | | | | |
|---|---|---|---|---|
| 1,133,692 A | * | 3/1915 | Adams | 193/4 |
| 3,053,367 A | * | 9/1962 | Lynch | 193/10 |
| 3,833,203 A | * | 9/1974 | Garlinghouse | 366/113 |
| 4,054,194 A | | 10/1977 | Davis | |
| 4,190,144 A | * | 2/1980 | Lybbert | 193/10 |
| 5,035,313 A | * | 7/1991 | Smith | 193/2 B |
| 5,184,706 A | * | 2/1993 | Christenson | 193/2 R |
| 5,244,069 A | | 9/1993 | Cosgrove | |
| 5,429,312 A | * | 7/1995 | Ohno et al. | 241/34 |
| D364,028 S | * | 11/1995 | Rouleau | D34/35 |
| 6,041,907 A | * | 3/2000 | Bonnette | 193/6 |
| 6,106,141 A | * | 8/2000 | Bruun | 366/68 |
| 6,367,606 B1 | | 4/2002 | Skalla et al. | |

OTHER PUBLICATIONS

PG Publication US 2003/0226737 A1 Quigley et al.*

* cited by examiner

*Primary Examiner*—Douglas Hess
(74) *Attorney, Agent, or Firm*—Birch, Stewart, Kolasch & Birch, LLP

(57) ABSTRACT

A concrete chute is extruded in two sections for permitting a light weight chute to be constructed wherein the sections are welded together and reinforced with a bottom stiffener for ensuring stability of the chute. A liner is designed to be installed from a distal or front end of the chute for facilitating the insertion and removal of the liner. The liner fits within an extruded slide disposed along the edges of the chute and is secured to the distal end of the chute by a liner retainer to ensure that concrete does not seep between the liner and the chute. An extruded pin retainer is provided that is positioned on a proximal end of the chute for enabling attachment of the chute to a cement truck or to the distal end of an adjacent chute during use in dispensing concrete from the truck.

11 Claims, 7 Drawing Sheets

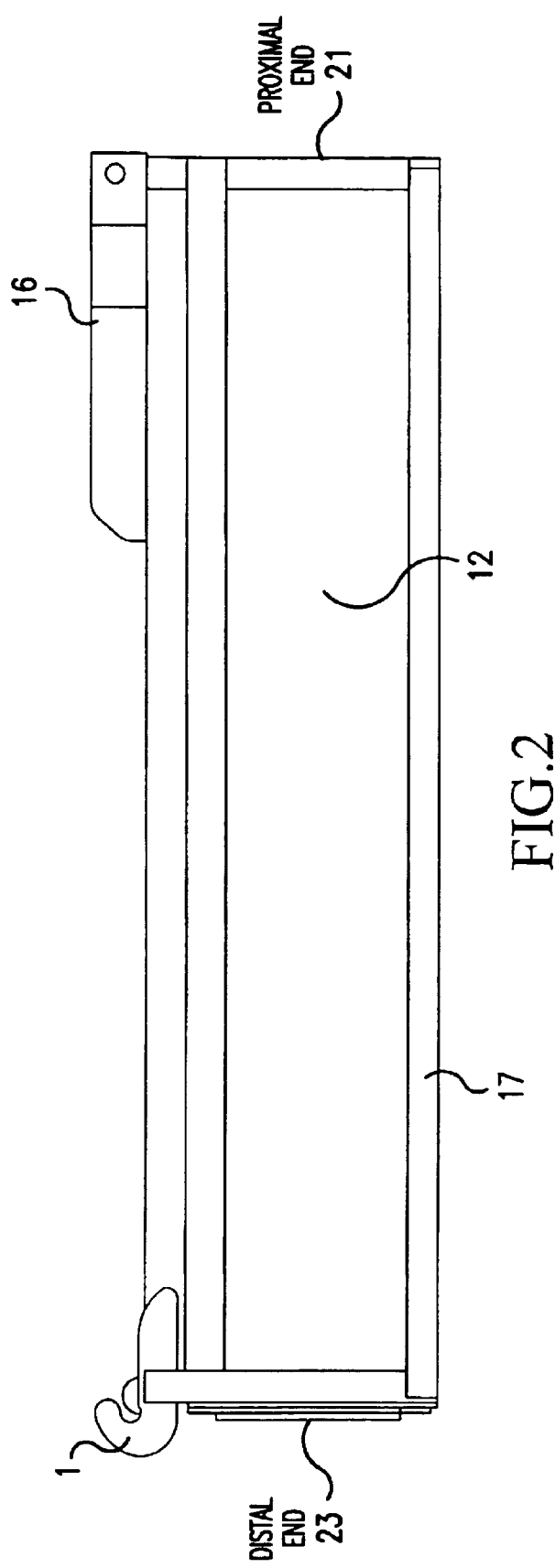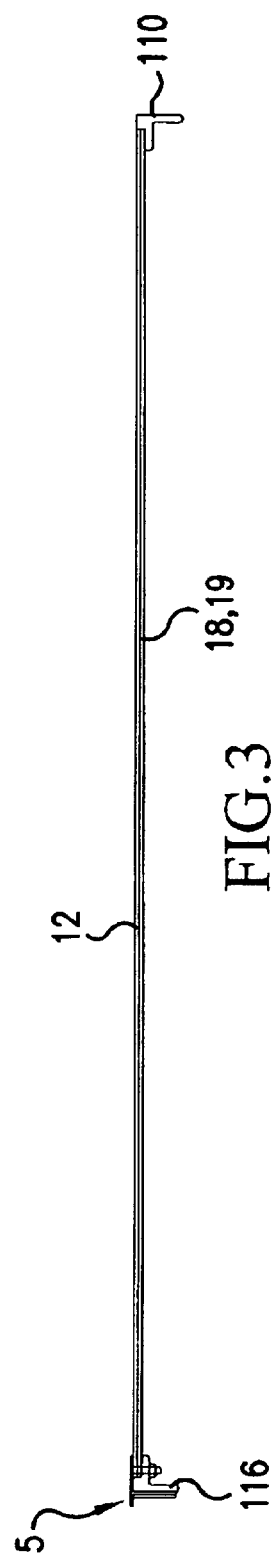

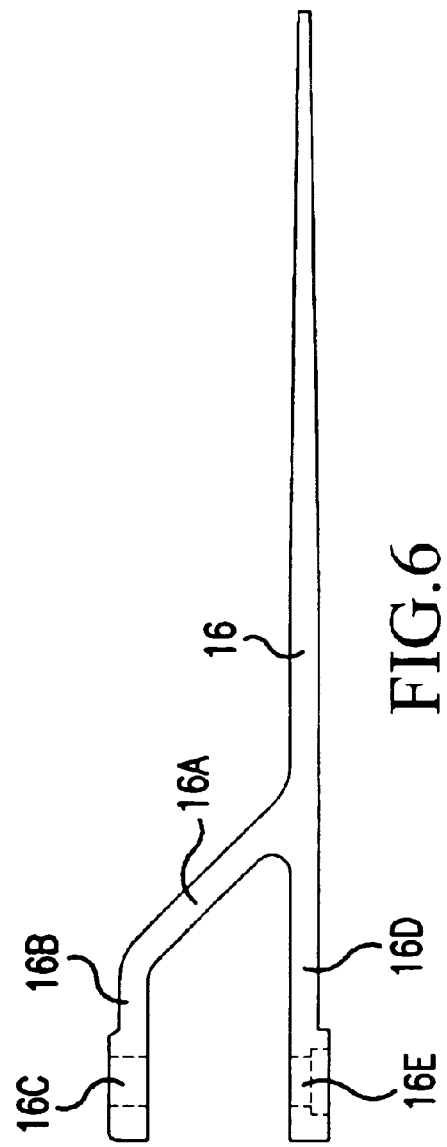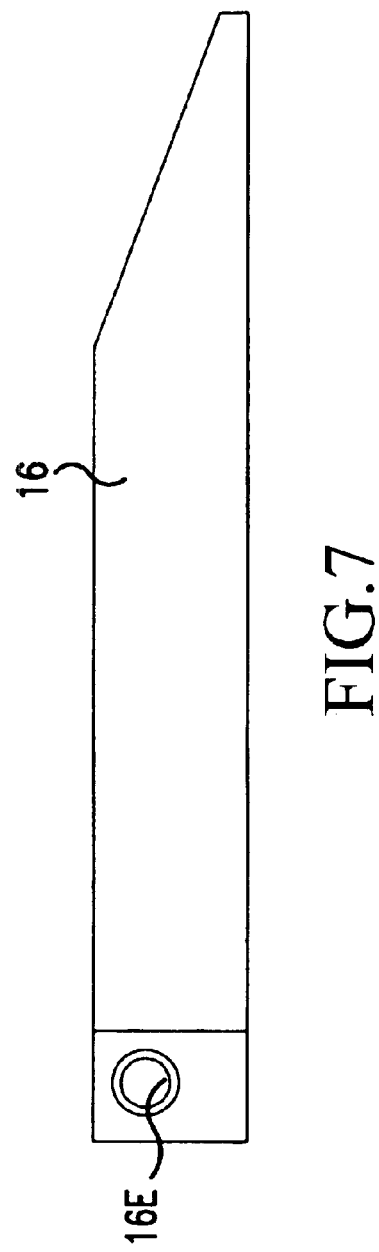

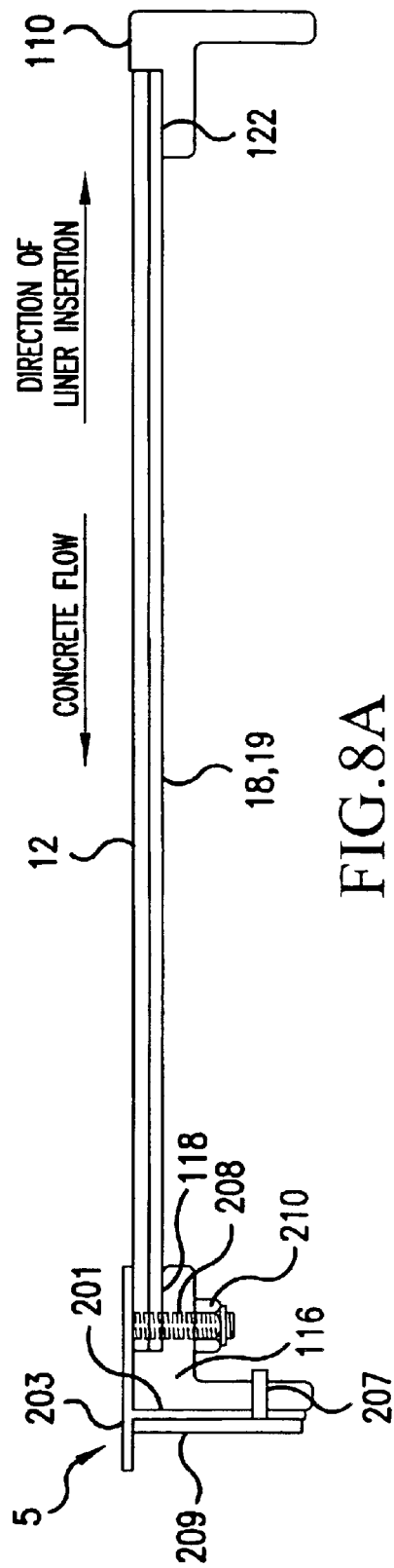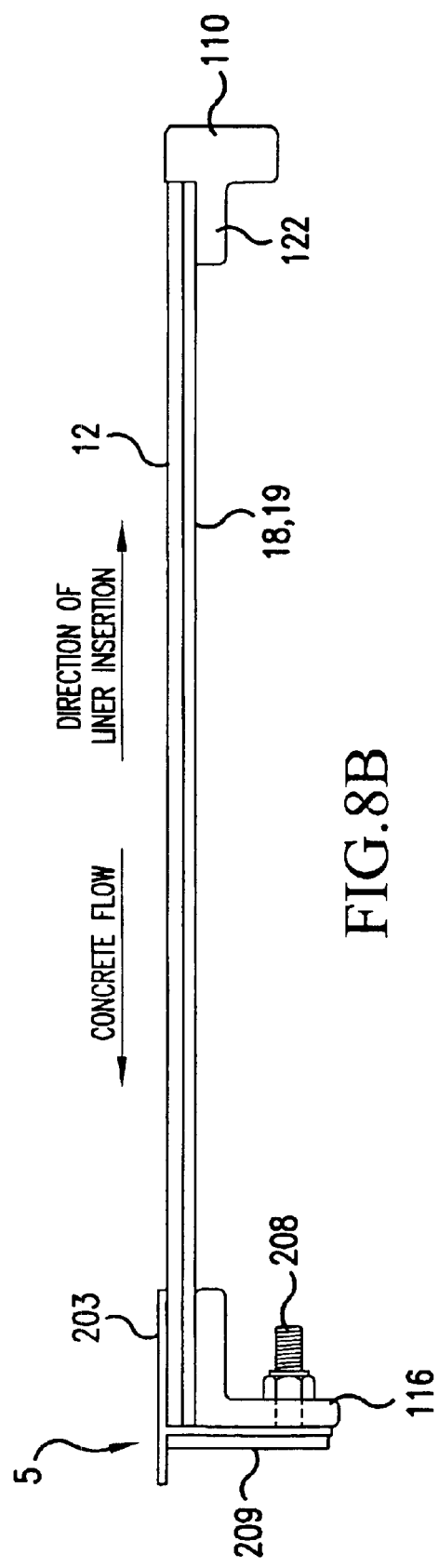

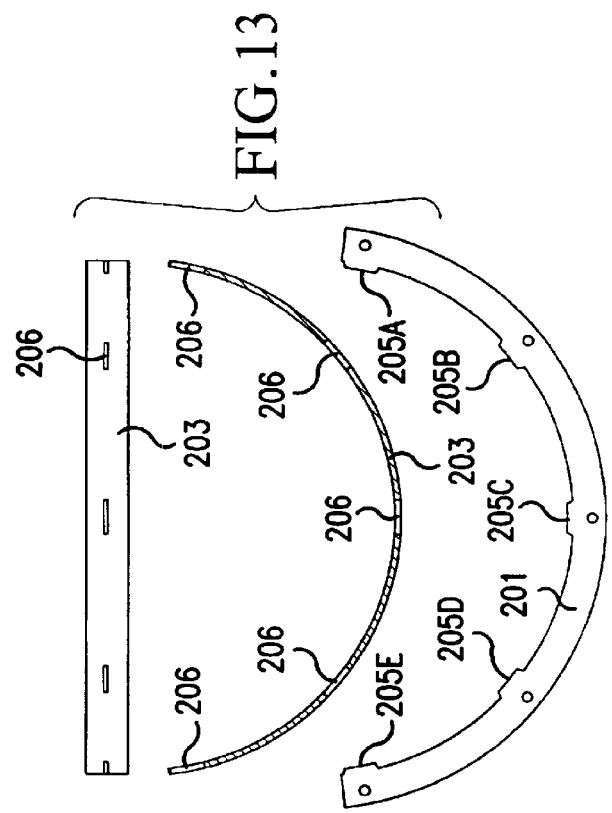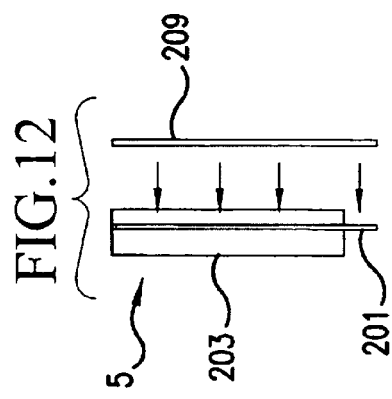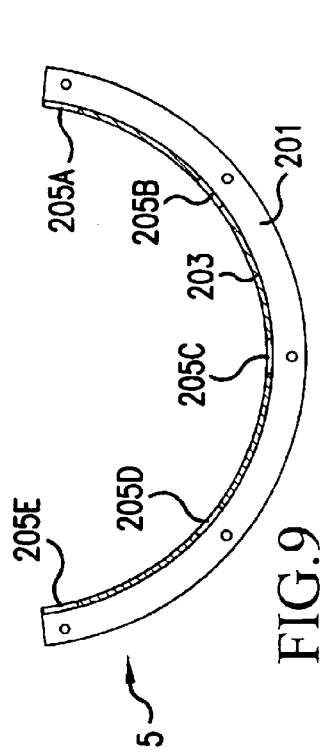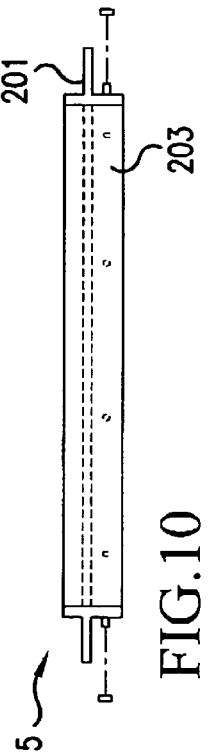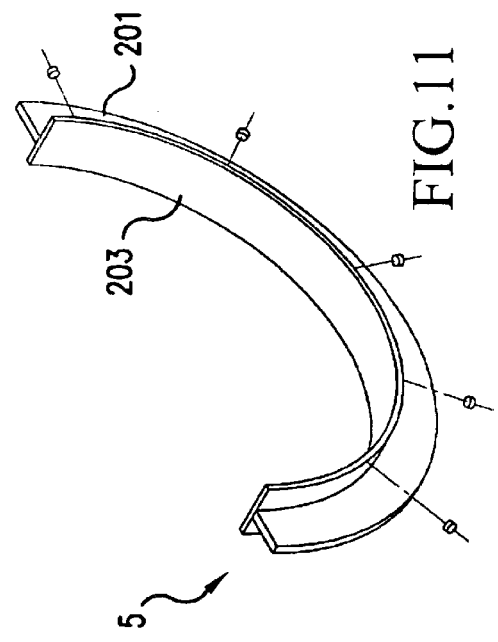

CONCRETE CHUTE

CROSS-REFERENCE TO RELATED APPLICATION

The present application claims priority under 35 U.S.C. §119(e) to U.S. Provisional Application No. 60/444,675, filed Feb. 4, 2003, the entire contents of which are hereby incorporated by reference.

BACKGROUND OF THE INVENTION

1. Field of the Invention

The present invention is directed to a chute for use in connection with a concrete truck wherein the chute is an extruded chute with a liner that is mounted within the interior portion of the chute for easy replacement.

2. Description of Background Art

Heretofore, chutes for use in connection with concrete trucks were fabricated from steel that is formed into the desired shape. Prior chutes are relatively heavy and are subject to wear due to the abrasive nature of the concrete as it is dispensed from the concrete truck.

Liners have been proposed for positioning within the chutes to enhance the longevity of the chutes. Some liners are retained relative to the chute by use of threaded fasteners. Such a construction may result in the threaded fasteners being coated with concrete and thereafter rendered inoperative.

A liner has been proposed that is a slide-in liner. Such a liner is not retained by threaded fasteners. A problem occurs with regard to such a liner in that concrete has a tendency to seep underneath the liner to be positioned between the liner and the chute. When this occurs, it is difficult to remove the liner from the chute for replacing the liner. In addition, such a liner includes notches for mounting the liner relative to the chute. The notches require the liner to be removed from the back of the chute. Thus, it is difficult for inserting a replacement liner into the chute.

SUMMARY AND OBJECTS OF THE INVENTION

It is an object of the present invention to provide a concrete chute that is extruded for permitting a light weight chute to be constructed for use with a concrete truck.

It is another object of the present invention to provide a liner for the concrete chute that is installed from the front of the chute for facilitating the insertion and removal of the liner.

It is a further object of the present invention to provide an extruded pin retainer for positioning on a proximal end of the chute for enabling attachment of the chute to a cement truck or to the distal end of an adjacent chute during use in dispensing concrete from the truck.

These and further object of the present invention are provide by a concrete chute that is extruded in two sections for permitting a light weight chute to be constructed wherein the sections are welded together and reinforced with a bottom stiffener for ensuring stability of the chute. The liner is designed to be installed from the distal or front end of the chute for facilitating the insertion and removal of the liner. The liner fits within an extruded slide disposed along the edges of the chute and is secured to the distal end of the chute by a liner retainer to ensure that concrete does not seep between the liner and the chute. An extruded pin retainer is provided that is positioned on a proximal end of the chute for enabling attachment of the chute to a cement truck or to the distal end of an adjacent chute during use in dispensing concrete from the truck.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is an elevational view of the cement chute;

FIG. 3 is a partial cross-sectional view illustrating the extruded chute and the liner for the chute;

FIG. 6 is a top plan view of an extruded bolt bracket (extruded pin retainer) used in combination with the cement chute of the present invention;

FIG. 7 is side elevational view of the extruded bolt bracket (extruder pin retainer) illustrated in FIG. 6;

FIGS. 8(A) and (B) are partial cross-sectional views of the cement chute illustrating the liner retained relative to the extruded chute by means of a liner retainer;

FIG. 9 is a front elevational view of the liner retainer;

FIG. 10 is top plan view of the liner retainer illustrated in FIG. 9;

FIG. 11 is a perspective view of the liner retainer illustrated in FIG. 9;

FIG. 12 is an exploded view of a rubber seal used together with the liner retainer, and FIG. 13 is an exploded view of the components of the liner retainer illustrating slots and tabs for welding the components together.

DETAILED DESCRIPTION OF THE PREFERRED EMBODIMENTS

Figure 1:
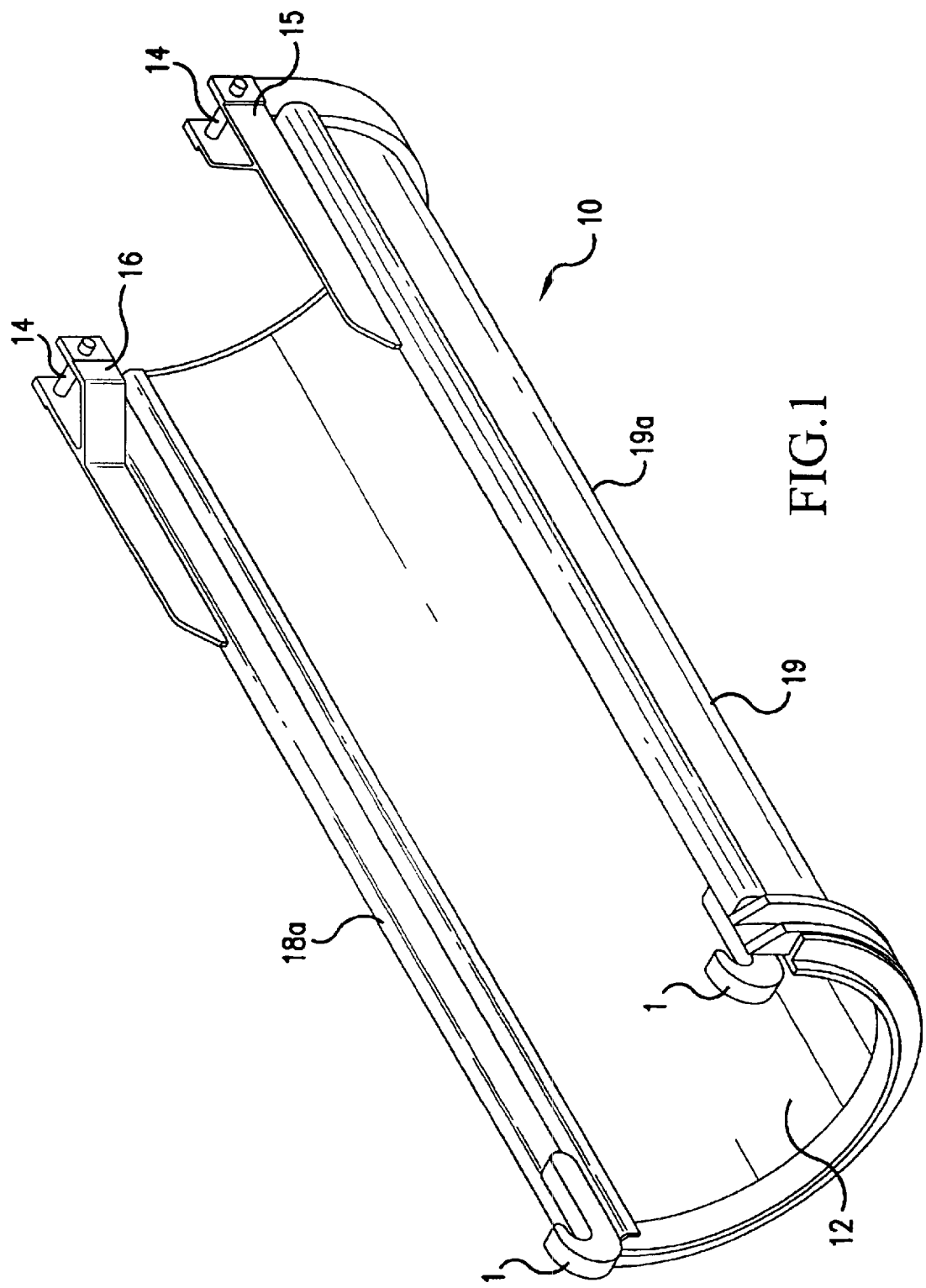
FIG. 1 is perspective view of a cement chute according to the present invention.
Figure 4:
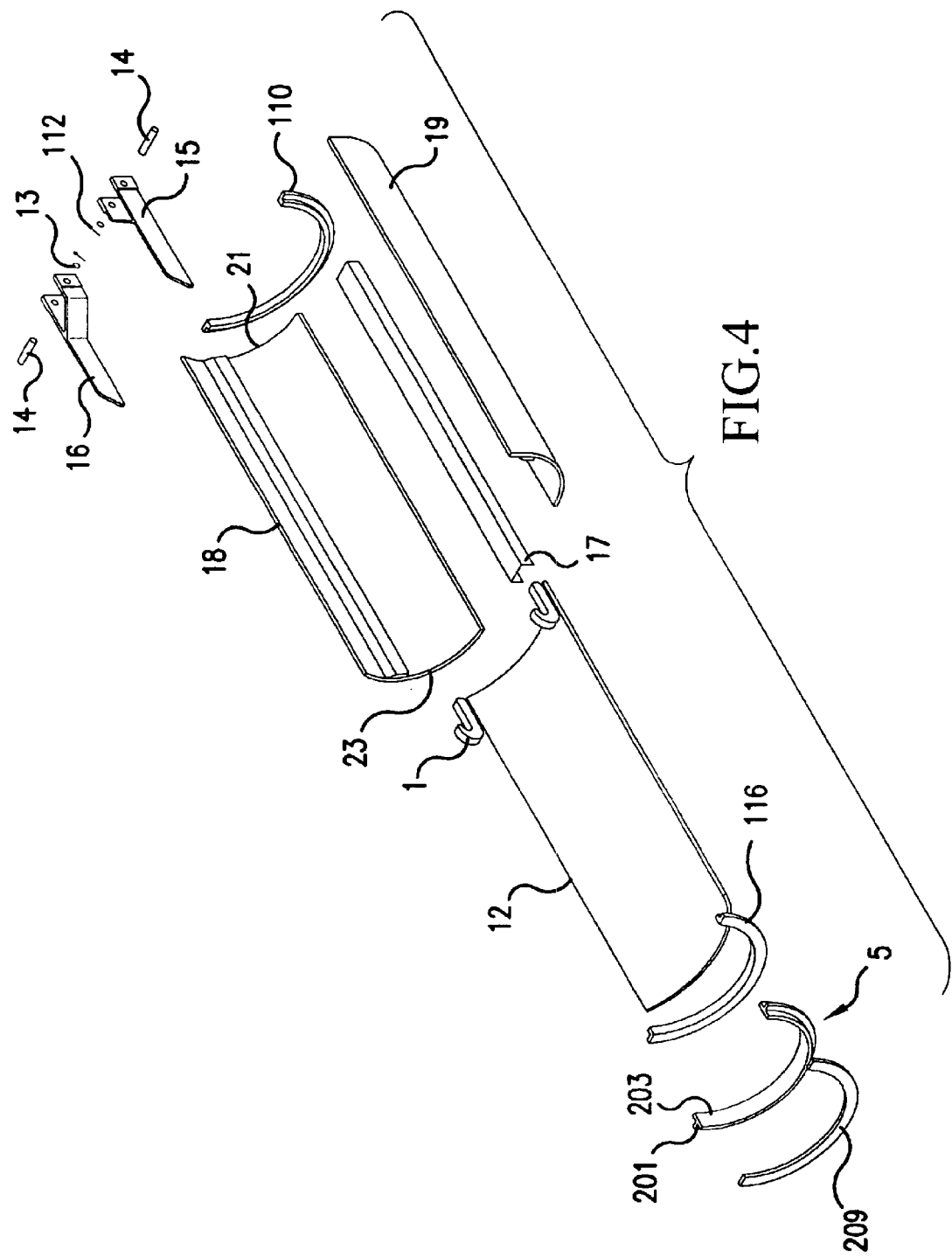
FIG. 4 is an exploded view illustrating the various portions that form the cement chute.
Figure 5:
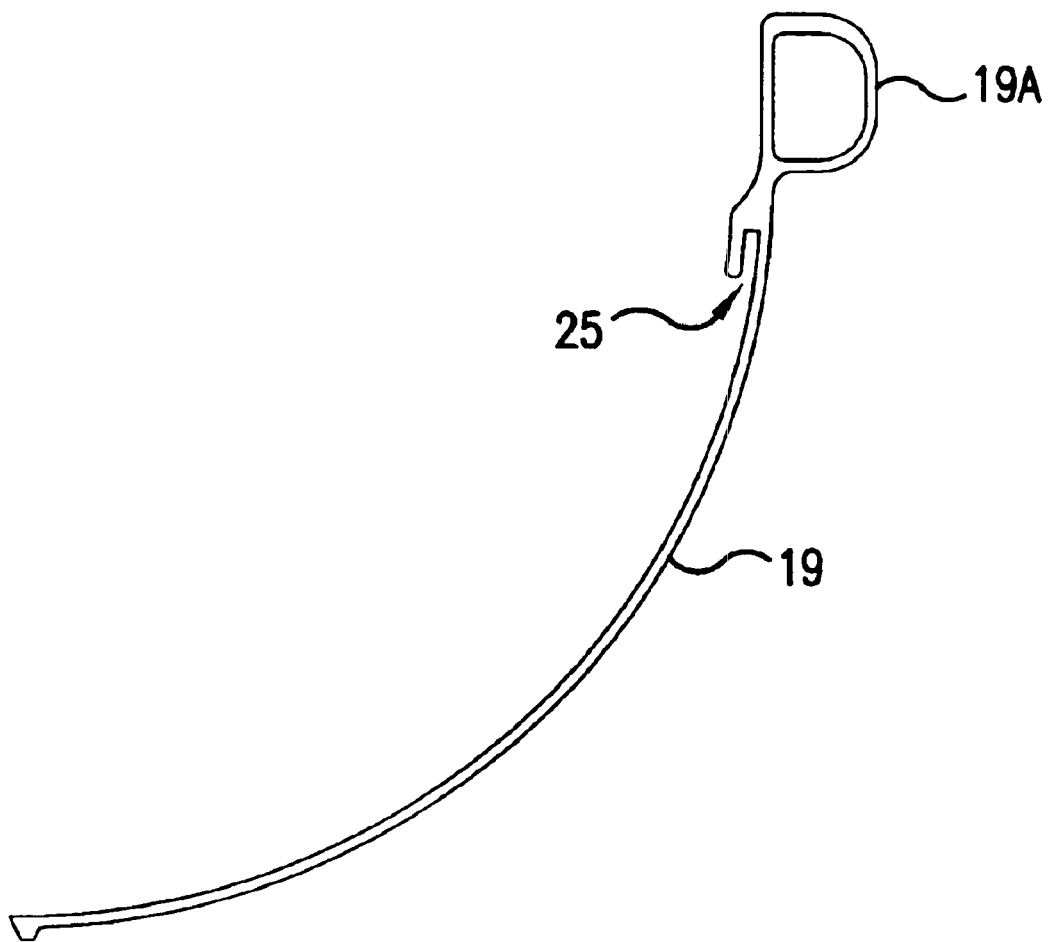
FIG. 5 is a cross-sectional view of a portion of the extruded cement chute.

As illustrated in FIGS. 1-5 a concrete chute 10 includes two sections 18, 19 that are extruded in one piece for permitting a light weight chute to be constructed. The two sections 18, 19 are welded along a centerline from a proximal end 21 to a distal end 23. The two welded sections 18, 19 are reinforced with a bottom stiffener 17 for ensuring stability of the chute 10. A liner 12 is designed to be installed from the distal or front end 23 of the chute 10 for facilitating the insertion and removal of the liner 12. The liner 12 fits within an extruded slide 25 disposed along the edges of the chute 10 and is secured to the distal end 23 of the chute by a liner retainer 5 to ensure that concrete does not seep between the liner 12 and the chute 10. As illustrated in FIG. 5 the upper end of the welded section 19 includes a reinforcing member 19A. A similar reinforcing member 18A is disposed on the upper end of the welded section 18 as illustrated in FIG. 1. Designing the chute 10 to include two welded sections 18, 19 reduces the welding, forming, and rolling of the main chute body.

As illustrated in FIGS. 1 and 4, the chute 10 includes hooks 1 disposed at the distal or front end 23 of the chute 10. The hooks 1 of one chute are designed to mate with pins 14, 14 disposed within right and left extruded pin retainers 15, 16 mounted on a proximal end 21 of an adjacent chute 10. The pins 14, 14 are retained relative to the extruded pin retainers 15, 16 by means of washers 13 and cotter pins 112, or other fastening members.

As illustrated in FIG. 4 and FIGS. 8(A) and (B), a reinforcement bar 110 is disposed at the proximal end 21 of the chute 10. The reinforcement bar 110 includes a step 122 positioned along an edge thereof for mounting the liner 12 relative to the two welded sections 18, 19. Extruding the reinforcement bar 110 with the step 122 creates a seal between two adjacent chutes connected end-to-end, the seal preventing aggregate from leaking from the connection.

As illustrated in FIG. 4 and FIGS. 8(A) and (B), a reinforcement bar 116 is disposed at the distal or front end 23 of the chute 10. The reinforcement bar 116 includes a step 118 positioned along an edge thereof for mounting the liner 12 relative to the two welded sections 18, 19.

As illustrated in FIGS. 4 and 8-13, the liner retainer 5 includes a semi-circular member 201 with a weld strip 203 disposed to be mounted within the curved portion of the semi-circular member 201 by welding. Welding tabs 205A to 205E position the weld strip 203 relative to the semi-circular member 201 for ensuring accurate positioning during welding. The semi-circular member 201 includes a plurality of mounting projections disposed within apertures 206 formed in the reinforcement bar 116. As shown in FIG. 8(A), the weld strip 203 includes a plurality of threaded members 208 and pins 207 designed to be positioned within apertures formed in the reinforcement bar 116. Alternatively, as shown in FIG. 8(B), the threaded members 208 penetrate the outer face of semi-circular member 201. A rubber strip 209 is mounted on an outer surface of the semi-circular member 201 and the reinforcement bar 116 on the distal end of one chute 10, thus forming a seal between on that chute 10 and the reinforcement bar 110 on the proximal end of an adjacent chute 10. The rubber strip 209 together with an portion of the weld strip 203 extending forwardly over the reinforcement bar 116 of the adjacent chute 10, provide a seal to prevent aggregate from leaking from the connection between the adjacent chutes.

As illustrated in FIGS. 1, 4, 6, and 7, the right and left extruded pin retainers 15, 16 are provided and positioned on a proximal end 21 of the chute 10 for enabling attachment of the chute 10 to a cement truck or to hook 1 on the distal end of an adjacent chute during use in dispensing concrete from the truck. As shown in FIGS. 6 and 7, the extruded pin retainer 16 includes an arm 16A that terminates with a connecting portion 16B. An aperture 16C is disposed within the connecting portion 16B. A distal end 16D of the extruded pin retainer 16 includes an aperture 16E. A pin 14 is adapted for insertion within the apertures 16C and 16E and is retained therein by means of a washer 13 and a cotter pin 1 12, as shown in FIG. 4.

Many variations of the embodiment described herein are to be considered within the scope of the present invention.

For example, the inventors have found extruded pin retainers 15, 16 (See FIGS. 6 and 7) having lengths of approximately 15", heights of approximately 2", and spacing between the arm 16A and connecting portion 16B of approximately 2", to be satisfactory. However, pin retainers 15, 16 formed by other methods, and having different dimensions may be used.

FIGS. 8(A) and (B) shows the threaded members 208 of the retainer liner 5 being bolts, however other attachment means are possible. FIGS. 9 and 13 show strip 205 with apertures 206 of the retainer liner 5 being welded to semi-circular member 201 at welding tabs 205A–E. While these part may be made of steel and welded together, different materials and or other attachment means may be used.

The invention being thus described, it will be obvious that the same may be varied in many ways. Such variations are not to be regarded as a departure from the spirit and of the invention, and all such modifications as would be obvious to one skilled in the art are intended to be included within the scope of the following claims.

What is claimed is:

1. A concrete chute comprising:
   a first extruded section includes a proximal end and a distal end;
   a second extruded section includes a proximal end and a distal end;
   said first and second extruded sections being welded together;
   a liner adapted to be installed from the distal or front end of the chute for facilitating the insertion and removal of the liner; and
   a liner retainer mounted at the distal end of the chute to ensure that aggregate does not seep between the liner and the chute, wherein said liner retainer includes a semi-circular member and a weld strip mounted to be spaced above an upper surface of the distal end of the chute for forming a receiving slot for receiving said liner in a fluid tight engagement for forming a seal for preventing aggregate from leaking under the liner of the chute or under a liner of an adjacent chute.

2. The concrete chute according to claim 1, and further including an extruded slide disposed along the edges of the chute for securing edges of said liner.

3. The concrete chute according to claim 1, wherein the weld strip spaced above the upper surface on the distal end of the chute extends forwardly over the proximal end of an adjacent chute for forming the seal for preventing the aggregate from leaking between the two chutes.

4. The concrete chute according to claim 1, and further including a bottom stiffener mounted on the first and second extruded sections for reinforcing the chute.

5. The concrete chute according to claim 1, and further including a reinforcement bar disposed at the proximal end of the chute for reinforcing the chute.

6. The concrete chute according to claim 1, and further including a reinforcement bar disposed at the distal end of the chute for reinforcing the chute.

7. A concrete chute comprising:
   a first extruded section includes a proximal end and a distal end;
   a second extruded section includes a proximal end and a distal end;
   said first and second extruded sections being welded together;
   weld strip mounted to be spaced above an upper surface of a distal end of the chute; and
   an extruded pin retainer positioned on the proximal end of the chute for enabling attachment of the chute to at least one of a cement truck and a distal end of an adjacent chute during use in dispensing concrete from the truck.

8. The concrete chute according to claim 7, wherein the weld strip mounted to be spaced above an upper surface on the distal end of the chute extends forwardly over the proximal end of the adjacent chute for forming the seal for preventing the aggregate from leaking between the two chutes.

9. The concrete chute according to claim 7, said first and second extruded sections being mirror images of each other.

10. The concrete chute according to claim 7, further comprising a bottom stiffener disposed along a centerline of the chute where the two sections are welded together.

11. A concrete chute comprising:
at least one extruded section having a proximal end and a distal end;
a liner adapted to be installed from the distal or front end of the chute for facilitating the insertion and removal of the liner; and
a strip extruded to be spaced above an upper surface of a distal end of the chute,
wherein the strip includes a receiving slot for receiving said liner in a fluid tight engagement for forming a seal for preventing aggregate from leaking under the liner of the chute or under a liner of an adjacent chute.

* * * * *